(12) United States Patent
Raghavendran et al.

(10) Patent No.: US 8,568,853 B2
(45) Date of Patent: Oct. 29, 2013

(54) LIGHTWEIGHT THERMOPLASTIC COMPOSITE INCLUDING BI-DIRECTIONAL FIBER TAPES

(75) Inventors: Venkat Raghavendran, Forest, VA (US); Gary Francis Smith, Lynchburg, VA (US)

(73) Assignee: Hanwha Azdel, Inc., Forest, VA (US)

( * ) Notice: Subject to any disclaimer, the term of this patent is extended or adjusted under 35 U.S.C. 154(b) by 1194 days.

(21) Appl. No.: 12/002,518

(22) Filed: Dec. 14, 2007

(65) Prior Publication Data

US 2009/0155522 A1    Jun. 18, 2009

(51) Int. Cl.
*B32B 5/00* (2006.01)
*B32B 5/26* (2006.01)

(52) U.S. Cl.
USPC ............. 428/113; 428/98; 428/105; 442/150; 442/381; 442/409

(58) Field of Classification Search
USPC ............. 428/113, 105, 98; 442/150, 381, 409
See application file for complete search history.

(56) References Cited

U.S. PATENT DOCUMENTS

| | | | |
|---|---|---|---|
| 2005/0153120 A1* | 7/2005 | Birrell | 428/298.1 |
| 2005/0215698 A1* | 9/2005 | Raghavendran et al. | 524/494 |
| 2006/0244170 A1* | 11/2006 | Brentrup et al. | 264/122 |
| 2008/0233342 A1 | 9/2008 | Birrell | |
| 2009/0053458 A1 | 2/2009 | Birrell | |

* cited by examiner

*Primary Examiner* — Brent T O'Hern
(74) *Attorney, Agent, or Firm* — Rhodes IP PLC

(57) ABSTRACT

A fiber reinforced thermoplastic composite having an improved combination of flexural, impact, and heat distortion characteristics. The composite comprises a fiber reinforced thermoplastic core containing fibers bonded together with a first thermoplastic resin in which the core has a first surface and a second surface and at least one first skin applied to the first surface. The first skin comprises one or more bi-directional continuous fiber tapes having a plurality of continuous fibers bonded together with one or more thermoplastic resins. The fibers in each first skin are arranged in a first and a second direction, with the fibers in each direction being unidirectionally oriented within the skin. Bi-directional orientation of the continuous fiber tapes is present in at least one of the tapes, or is achieved through the use of two or more tapes having unidirectional continuous fibers.

24 Claims, 2 Drawing Sheets

LIGHTWEIGHT THERMOPLASTIC COMPOSITE INCLUDING BI-DIRECTIONAL FIBER TAPES

FIELD OF THE INVENTION

This invention relates generally to lightweight fiber reinforced thermoplastic polymer composites, more particularly to lightweight fiber reinforced thermoplastic polymer composite materials that include one or more skins comprising one or more bi-directional continuous fiber tapes, and to certain improvements in the mechanical and heat distortion characteristics of such materials and articles formed therefrom. Although not limited thereto, the invention is useful in the manufacture of automotive, rail, bus, marine, and aerospace articles in which the improved characteristics provide advantages over other materials utilized for such applications.

BACKGROUND OF THE INVENTION

Driven by a growing demand by industry, governmental regulatory agencies and consumers for durable and inexpensive products that are functionally comparable or superior to metal products, a continuing need exists for improvements in composite articles subjected to difficult service conditions. This is particularly true in the automotive industry where developers and manufacturers of articles for automotive and construction materials applications must meet a number of competing and stringent performance specifications for such articles.

In an effort to address these demands, a number of composite materials have been developed, including glass fiber reinforced thermoplastic composites. Such composites provide a number of advantages, e.g., they can be molded and formed into a variety of suitable products both structural and non-structural, including, among many others, automotive bumpers, interior headliners, and interior and exterior trim parts. Traditional glass fiber composites used in exterior structural applications are generally compression flow molded and are substantially void free in their final part shape. By comparison, low density glass fiber composites used in automotive interior applications are generally semi-structural in nature and are porous and light weight with densities ranging from 0.1 to 1.8 $g/cm^3$ and containing 5% to 95% voids distributed uniformly through the thickness of the finished part. The stringent requirements for certain applications, such as in the automotive industry have been difficult to meet, however, for existing glass fiber composite products, particularly where such applications require a desirable combination of properties, such as light weight, good flexural and impact properties, as well as good heat distortion temperature characteristics. As a result, a continuing need exists to provide further improvements in the ability of thermoplastic composite materials to meet such performance and property standards.

BRIEF DESCRIPTION OF THE INVENTION

Accordingly, in one aspect of the invention, a fiber reinforced composite is provided having an improved combination of flexural, impact, and heat distortion temperature characteristics. The composite generally comprises a fiber reinforced thermoplastic core comprising a plurality of reinforcing fibers bonded together with one or more first thermoplastic resins in which the core has a first surface and a second surface and at least one first skin applied to the first surface. The first skin comprises a plurality of fibers bonded together with one or more second thermoplastic resins, having a plurality of continuous fibers arranged in a first principal direction and a plurality of continuous fibers arranged in a second principal direction and one or more second thermoplastic resins impregnated within the bi-directional continuous fiber tape. The plurality of continuous fibers in both the first principal and second directions are independently arranged in a corresponding first and second unidirectional orientation. In general, the composite demonstrates an improved combination of flexural, impact, and heat distortion temperature properties at reduced fiber content in the thermoplastic core. While not limited thereto, in certain aspects of the invention, the flexural modulus of the composite is greater than about 2000 MPa, the flexural strength is greater than about 15 MPa, and/or the impact energy is greater than about 11 Joules.

In particular aspect of the invention, the bi-directional continuous fiber tape comprises one or more first unidirectional tapes having a plurality of continuous fibers arranged in the first principal direction and one or more second unidirectional tapes having a plurality of continuous fibers arranged in the second principal direction. The first and second unidirectional tapes are independently impregnated with the one or more second thermoplastic resins that are the same or different.

In further particular aspect of the invention, the bi-directional continuous fiber tape comprises one or more tapes formed from a first plurality of continuous fibers arranged in the first principal direction and a second plurality of continuous fibers arranged in the second principal direction, the tape comprising both the first and second plurality of continuous fibers and being impregnated with the one or more second thermoplastic resins.

DETAILED DESCRIPTION OF THE INVENTION

Figure 1:
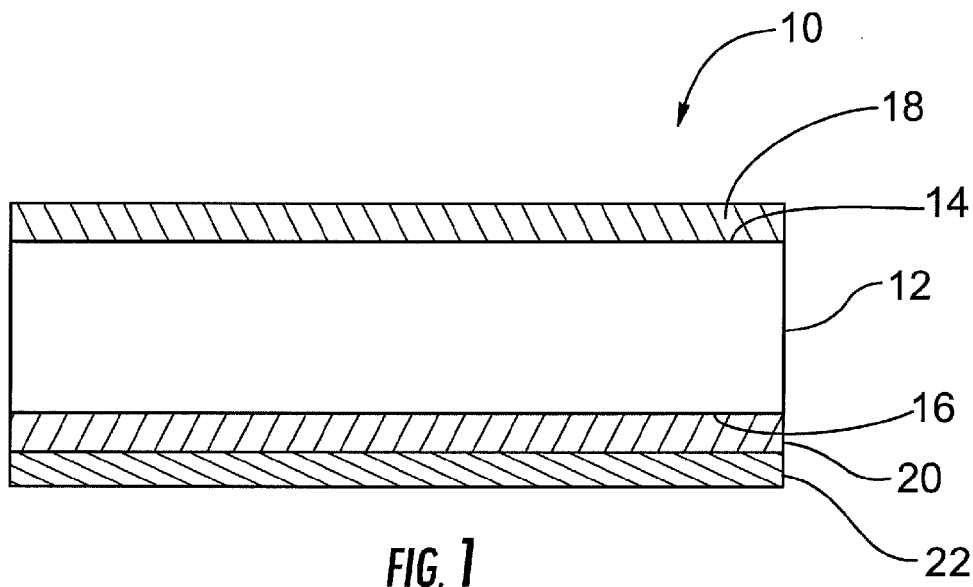
FIGS. 1-2 are sectional schematic illustrations of composite thermoplastic sheets in accordance with an embodiment of the present invention.

As used in the specification and the appended claims, the singular forms "a," "an," and "the" include plural referents unless the context clearly dictates otherwise. Thus, for example, reference to "a thermoplastic resin" encompasses a combination or mixture of different resins as well as a single resin, reference to "a skin layer" or "a surface layer" includes a single layer as well as two or more layers that may or may not be the same and may be on one or more sides or surfaces of the composite material, and the like.

As used herein, the term "about" is intended to permit some variation in the precise numerical values or ranges specified. While the amount of the variation may depend on the particular parameter, as used herein, the percentage of the variation is typically no more than 5%, more particularly 3%, and still more particularly 1% of the numerical values or ranges specified.

In this specification and in the claims that follow, reference will be made to a certain terms, which shall be defined to have the following meanings:

The term "basis weight" generally refers to the areal density of a fiber reinforced thermoplastic material, typically expressed in grams per square meter ($g/m^2$ or gsm) of the material in sheet form. The term "reduced basis weight"

refers to a reduction in the basis weight that may be realized for composites according to the invention relative to a comparative composite not having all of the features of the invention. As used herein, such a "comparative composite material" differs from the inventive material, e.g., in one or more of the characteristics of the fibers, thermoplastic resins, or the characteristics of the layer(s) forming part of the composite.

The term "substantially free" as it is applied to the description of the plurality of fibers in the first skin in which the skin is described as being "substantially free" of fiber cross-over, where an angle that a cross-over fiber makes with the plurality of fibers is equal to or greater than a specified angle, is intended to mean that greater than about 90%, more particularly greater than about 95%, of such fibers are free of fiber cross-over in the skin. This understanding of the meaning of the term "substantially free" is intended to apply to any angular condition for the fiber cross-over.

The term "tape" generally refers to a reinforced fibrous material in a thermoplastic resin matrix, generally including film or sheet materials. Such materials are not intended to be limited to particular dimensional or fiber orientation requirements.

The term "bi-directional" generally refers to at least two orientations, or principal directions, of the unidirectional continuous fibers.

In general, the composite of the invention includes a thermoplastic core formed from one or more thermoplastic resins and discontinuous fibers dispersed within the thermoplastic resin(s). One or more skin layers comprising one or more bi-directional continuous fiber tapes having a plurality of continuous fibers arranged in a first principal direction and a plurality of continuous fibers arranged in a second principal direction and one or more second thermoplastic resins impregnated within the bi-directional continuous fiber tape is also included on one or more of the surfaces of the fiber-containing thermoplastic core. The fibers of the first and second principal directions are arranged in corresponding first and second unidirectional orientations. The thermoplastic composite may be formed into various types of articles, e.g., automotive components, such as interior components and exterior body panels, as well as other articles noted herein. In certain embodiments, the composite may provide an improved combination of composite flexural, impact, and heat distortion properties compared to other known fiber reinforced thermoplastic composites.

In one aspect of the invention, the mechanical properties of the composite may be improved; e.g., the flexural modulus and strength of the composite may be greater than about 2,000 MPa and greater than about 15 MPa, respectively, and the impact energy of the composite may be greater than about 11 Joules. Without limitation, the invention includes composites wherein the mechanical, impact, and heat distortion characteristics of the composite noted herein may be improved individually or in any combination with each other. Such composites include more particular embodiments wherein, e.g., the flexural, impact, and heat distortion properties are each within the limits noted herein, as well as any such other combination.

As described herein, the composite may be non-porous or porous. Advantageously, the thermoplastic core has a porosity greater than about 0% by volume of the thermoplastic core, more particularly between about 0% to about 95% by volume of the thermoplastic core, and still more particularly between about 30% to about 80% by volume of the thermoplastic core. While not required, it is also possible that the composite, which includes the thermoplastic core, is non-porous or has a porosity within the aforementioned ranges; i.e., the porosity of the composite material may generally vary between about 0% and about 95% of the total volume of the composite material.

The thermoplastic resin may generally be any thermoplastic resin having a melt temperature below the resin degradation temperature. Non-limiting examples of such resins include polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyimides, polyphenylene ether, polyphenylene oxide, polyphenylenesulphide, polyethers, polyetherketones, polyacetals, polyurethanes, polybenzimidazole, and copolymers or mixtures thereof. Other thermoplastic resins can be used that can be sufficiently softened by heat to permit fusing and/or molding without being chemically or thermally decomposed during processing or formation of the composite material. Such other suitable thermoplastic resins will generally be apparent to the skilled artisan.

Fibers suitable for use in the invention include glass fibers, carbon fibers, graphite fibers, synthetic organic fibers, particularly high modulus organic fibers such as para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural an/or synthetic fibers, ceramic fibers, or mixtures thereof. The fiber content in the thermoplastic core may be from about 15% to about 85%, more particularly from about 30% to about 60%, by weight of the thermoplastic core. Typically, the fiber content of the composite varies between about 20% to about 80% by weight, more particularly between about 40% to about 70% by weight of the composite. Fibers suitable for use herein are further described in the patent literature (as noted herein).

While not limited thereto, the fibers dispersed within the thermoplastic resin, forming the thermoplastic core of the composite, generally have a diameter of from about 5 µm to about 22 µm, and a length of from about 5 mm to about 200 mm; more particularly, the fiber diameter may be from about 10 µm to about 22 µm and the fiber length may be from about 5 mm to about 75 mm.

The composite may generally be prepared in various forms, such as sheets or films, as layered materials on preformed substrates, or in other more rigid forms depending on the particular application need. For certain applications, the composite is provided in sheet form and may optionally include one or more additional layers on one or both surfaces of such a sheet. Without limitation, such surface or skin layers may be, e.g., a film, non-woven scrim, a veil, a woven fabric, or a combination thereof. The skin or surface layer may be desirably air permeable and can substantially stretch and spread with the fiber-containing composite sheet during thermoforming and/or molding operations. In addition, such layers may be adhesive, such as a thermoplastic material (e.g., an ethylene acrylic acid copolymer or other such polymers) applied to the surface of the fiber-containing thermoplastic material. Generally, the areal density of the composite material, particularly when in sheet form, varies from about 400 g/m$^2$ to about 4000 g/m$^2$.

The composite material of the invention may be used to form various intermediate and final form articles, including construction articles or articles for use in automotive and other applications, including, without limitation, a parcel shelf, package tray, headliner, door module, instrument panel topper, body and hood panels, side wall panels such as for recreational vehicles, cargo liners, front and/or rear pillar trim, a sunshade, and the like. Other such articles will be apparent to the skilled artisan. The composite material can be molded into various articles using methods known in the art, for example, pressure forming, thermal forming, thermal stamping, vacuum forming, compression forming, and autoclaving. Such methods are well known and described in the literature, e.g., see U.S. Pat. Nos. 6,923,494 and 5,601,679. Thermoforming methods and tools are also described in detail in DuBois and Pribble's "Plastics Mold Engineering Handbook", Fifth Edition, 1995, pages 468 to 498.

It should be noted that while the inventive composite provides an improved combination of flexural, impact, and heat distortion characteristics, it is not necessary that all of these characteristics be individually improved. While improvement in each of these characteristics is certainly desirable, for the purposes described herein, an improved combination results if one, more than one, or all of these characteristics is or are improved relative to non-inventive or known composites.

As the thermoplastic resin containing fibers, the composite material of the invention may, according to one embodiment, include a low density glass mat thermoplastic composite (GMT). One such mat is prepared by AZDEL, Inc. and sold under the trademark SUPERLITE® mat. Preferably, the areal density of the such a GMT is from about 400 grams per square meter of the GMT ($g/m^2$) to about 4000 $g/m^2$, although the areal density may be less than 400 $g/m^2$ or greater than 4000 $g/m^2$ depending on the specific application needs. Preferably, the upper density should be less than about 4000 $g/m^2$.

The SUPERLITE® mat is generally prepared using chopped glass fibers, a thermoplastic resin and a thermoplastic polymer film or films and or woven or non-woven fabrics made with glass fibers or thermoplastic resin fibers such as polypropylene (PP), polybutylene terephthalate (PBT), polyethylene terephthalate (PET), polycarbonate (PC), a blend of PC/PBT, or a blend of PC/PET. Generally, PP, PBT, PET, and PC/PET and PC/PBT blends are the preferred thermoplastic resins. To produce the low density GMT, the materials and other additives are metered into a dispersing foam contained in an open top mixing tank fitted with an impeller. The foam aides in dispersing the glass fibers and thermoplastic resin binder. The dispersed mixture of glass and thermoplastic resin is pumped to a head-box located above a wire section of a paper machine via a distribution manifold. The foam, not the glass fiber or thermoplastic resin, is then removed as the dispersed mixture passes through a moving wire screen using a vacuum, continuously producing a uniform, fibrous wet web. The wet web is passed through a dryer to reduce moisture content and to melt the thermoplastic resin. When the hot web comes out of the dryer, a thermoplastic film may be laminated into the web by passing the web of glass fiber, thermoplastic resin and thermoplastic polymer film or films through the nip of a set of heated rollers. A non-woven and/or woven fabric layer may also be attached along with or in place thermoplastic film to one side or to both sides of the web to facilitate ease of handling the glass fiber-reinforced mat. The SUPERLITE® composite is then passed through tension rolls and continuously cut (guillotined) into the desired size for later forming into an end product article. Further information concerning the preparation of such GMT composites, including suitable materials used in forming such composites that may also be utilized in the present invention, may be found in a number of U.S. patents, e.g., U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US 2005/0228108, US 2005/0217932, US 2005/0215698, US 2005/0164023, and US 2005/0161865.

Figure 2:
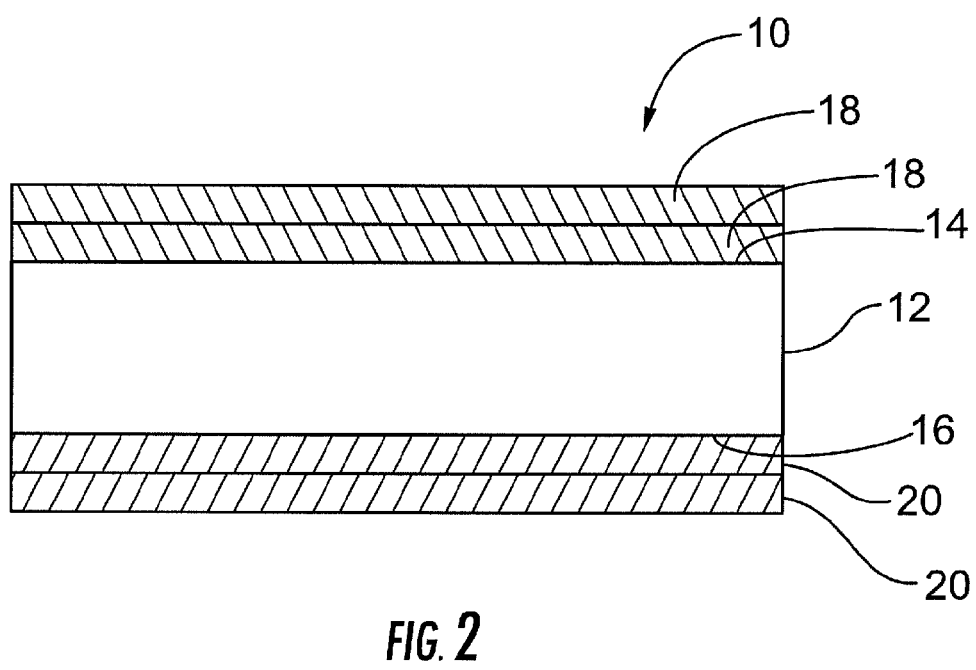

The present invention may be further understood in terms of non-limiting illustrative figures. FIGS. 1 and 2 are sectional schematic illustrations of a lightweight thermoplastic composite 10 according to the invention. In an exemplary embodiment, lightweight composite thermoplastic composite 10 includes a lightweight porous core 12 having a first surface 14 and a second surface 16. A first skin 18 is attached to first surface 14 of core 12. A second skin 20 may be attached to second surface 16 of core 12. A decorative skin 22 may be bonded to second skin 20. The thermoplastic composite 10 may include decorative skins 22 bonded to first and second skins 18 and 20, or no decorative skins. Also, as described herein, the composite may include more than one first skin 18 and more than one second skin 20.

Core 12 is formed from a web made up of open cell structures formed by random crossing over of fibers held together, at least in part, by one or more thermoplastic resins, where the void content of the core 12 ranges in general between about 0% and about 95%, more particularly greater than about 5%, and still more particularly between about 30% and about 80% of the total volume of core 12. In another aspect, porous core 12 is made up of open cell structures formed by random crossing over of reinforcing fibers held together, at least in part, by one or more thermoplastic resins, where about 40% to about 100% of the cell structure are open and allow the flow of air and gases through. Typically, core 12 has a density of about 0.1 gm/cc to about 2.25 gm/cc, more particularly about 0.1 gm/cc to about 1.8 gm/cc, and still more particularly about 0.3 gm/cc to about 1.0 gm/cc. Core 12 may be formed using known manufacturing process, for example, a wet laid process, an air or dry laid process, a dry blend process, a carding and needle process, and other processes that are employed for making non-woven products. Combinations of such manufacturing processes may also be used.

Core 12 may include about 15% to about 85% by weight of fibers having an average length of between about 5 mm and about 200 mm, and about 15% to about 80% by weight of a wholly or substantially unconsolidated fibrous or particulate thermoplastic materials, where the weight percentages are based on the total weight of core 12. In another aspect, core 12 includes about 30% to about 60% by weight of fibers. Fibers having an average length of between about 5 mm and about 25 mm are typically utilized in core 12. As noted herein, suitable fibers include, but are not limited to metal fibers, metalized inorganic fibers, metalized synthetic fibers, glass fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, and combinations thereof.

In one embodiment, fibers having an average length of about 5 mm to about 200 mm are added with thermoplastic powder particles such as polypropylene powder, to an agitated aqueous foam. In another embodiment, reinforcing fibers having an average length of about 5 mm to about 75 mm, or more particularly, about 5 mm to about 50 mm may be used. The components are agitated for a sufficient time to form a dispersed mixture of the reinforcing fibers and thermoplastic powder in the aqueous foam. The dispersed mixture is then laid down on any suitable support structure, for example, a wire mesh, and then the water is evacuated through the support structure forming a web. The web is dried and heated above the softening temperature of the thermoplastic powder. The web is then cooled and pressed to a predetermined thickness to produce core 12 having a porosity of greater than about 0%, more particularly between about 5% to about 95% by volume.

The web is heated above the softening temperature of the thermoplastic resins in core 12 to substantially soften the plastic materials and is passed through one or more consolidation devices, for example calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than about 5% void content and have negligible open cell structure.

Particulate plastic materials may include short plastics fibers that can be included to enhance the cohesion of the web structure during manufacture. Bonding is affected by utilizing the thermal characteristics of the plastic materials within the web structure. The web structure is heated sufficiently to cause the thermoplastic component to fuse at its surfaces to adjacent particles and fibers.

In one embodiment, the thermoplastic resin used to form core 12 is, at least in part, in a particulate form. Suitable thermoplastics include all of the resins noted hereinabove, without limitation.

Generally, thermoplastic resins in particulate form need not be excessively fine, although particles coarser than about 1.5 millimeters tend not flow sufficiently during the molding process to produce a homogenous structure. The use of larger particles can also result in a reduction in the flexural modulus of the material when consolidated.

Figure 3:
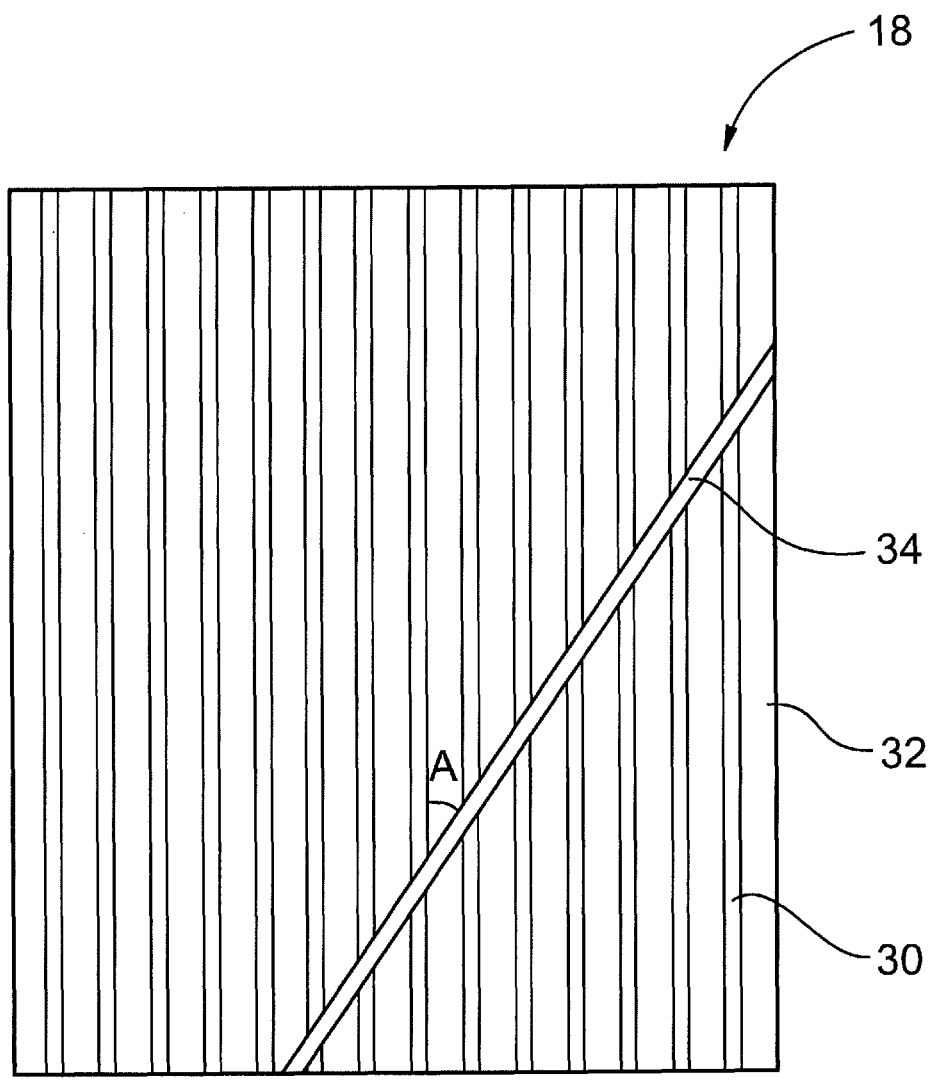
FIG. 3 is an enlarged schematic illustration of the composite thermoplastic sheet shown in FIG. 1.

Referring to another schematic illustration according to the invention, FIG. 3 depicts a first skin 18 that includes a plurality of unidirectional fibers 30 bonded together by one or more thermoplastic resins 32. By "unidirectional" it is meant that fibers are aligned substantially parallel to each other so that the longitudinal axis of fibers 30 are substantially parallel. Skin 18 is substantially free of fiber cross-over where an angle A that a cross-over fiber 34 makes with the longitudinal axis of the aligned fibers 30 is equal to or greater than 30 degrees. For multiple first skins 18, adjacent first skins 18 include fibers that are unidirectional in each skin 18 but the aligned fibers 30 in one skin 18 may be arranged at an angle to the aligned fibers 30 in the adjacent skin 18. This angle ranges from about 0 degrees to about 90 degrees. In a further aspect of the invention, the fibers in one or more of the continuous fiber tapes of the skins may be bi-directionally oriented in a +/−45 degree orientation relative to the machine or cross direction of the skin layer. For such a construction, the relative angle between first principal direction and the second principal direction of the skin layer fibers would be about 90 degrees. Second skin 20 (as shown in FIGS. 1 and 2), similar to first skin 18, includes a plurality of unidirectional fibers 30 bonded together by one or more thermoplastic resins 32. Also, in an embodiment that includes multiple second skins 20, adjacent second skins 20 include fibers that are unidirectional in each skin 20 but the aligned fibers 30 in one skin 20 may be arranged at an angle to the aligned fibers 30 in the adjacent skin 20. When present, the second skin of the composite may include one or more second skins comprising a plurality of fibers bonded together with one or more thermoplastic resins.

The fiber reinforced composite of the invention includes embodiments wherein one or more tapes is utilized in which the bi-directional orientation of the continuous fibers is present in at least one of the tapes, or is achieved through the use of two or more tapes having unidirectional continuous fibers. For example, in one embodiment, the bi-directional continuous fiber tape comprises one or more first unidirectional tapes having a plurality of continuous fibers arranged in a first principal direction and one or more second unidirectional tapes having a plurality of continuous fibers arranged in a second principal direction. In this embodiment, the first and second unidirectional tapes may be independently impregnated with one or more second thermoplastic resins that are the same or different.

In another embodiment, the bi-directional continuous fiber tape comprises one or more tapes formed from a first plurality of continuous fibers arranged in a first principal direction and a second plurality of continuous fibers arranged in a second principal direction, the tape comprising both the first and second plurality of continuous fibers and being impregnated with one or more second thermoplastic resins.

In a further aspect of the invention, the bi-directional continuous fiber tape may comprise a bulk tow mat having a plurality of layers of unidirectional fiber tows, with one or more layers having unidirectional fiber tows arranged in a first principal direction and one or more layers having unidirectional fiber tows arranged in a second principal direction.

In general, the orientation of the first principal direction ranges from about 0 to about 90 degrees relative to the orientation of the second principal direction. The angle defined by a longitudinal axis of the plurality of fibers in one first skin and a longitudinal axis of the plurality of fibers in an adjacent first skin may also range between about 0 degrees to about 90 degrees.

Skins 18 and 20 may also comprise prepreg structures formed by impregnating a resin on and around aligned fibers 30. Various methods of forming prepregs may be utilized, including without limitation, solution processing, slurry processing, direct impregnation of a fiber tow with molten polymer, fiber co-mingling, sintering of thermoplastic powder into a fiber tow, and the like. Such techniques are generally known in the art and will only be briefly described herein.

More particularly, solution processing involves dissolution of the resin polymer in a solvent and impregnation of a fiber tow with the resulting low viscosity solution. Suitable solvents used include, but are not limited to, methylene chloride, acetone and N-methyl pyrrolidone. Suitable resins used include, but are not limited to, epoxies, polyimides, polysulfone, polyphenyl sulfone and polyether sulfone. Complete removal of solvent after impregnation is usually needed, and is often a difficult step.

Slurry processing provides another method of forming the prepreg structure, wherein resin polymer particles are suspended in a liquid carrier forming a slurry with the fiber tow passed through the slurry to thereby trap the particles within the fiber tow.

The prepregs can also be formed by direct impregnation of the fiber tow with molten polymer. For thermoset resins like epoxy, temperature and reaction kinetics allow for a continuous melt impregnation before reaction. For thermoplastics, two approaches can generally be used. One approach is to use a cross head extruder that feeds molten polymer into a die through which the rovings pass to impregnate the fiber tow. Another approach is to pass the fibers through a molten resin bath fitted with impregnation pins to increase the permeability of the polymer into the tow. The impregnation pins can be heated to decrease viscosity locally to further improve the impregnation process. In either case, the force exerted on the fibers, for example, die pressure for the crosshead extruder, can sometimes be high, which can cause fiber damage.

Fiber co-mingling can also be used to form the prepregs in which a thermoplastic resin is spun into a fine yarn and co-mingled with the fiber tow to produce a co-mingled hybrid yarn. These hybrid yarns may then be consolidated to form composite films.

The prepregs may also be formed by introducing dry thermoplastic powder into a fiber tow that is then processed by heating to sinter the powder particles onto the fibers. This technique includes passing the fiber tow through a bed (either fluidized or loosely packed) of thermoplastic powder, for example, polypropylene particles with an average diameter of about 250 microns. The particles stick to the fibers due to electrostatic attraction. The tow is then heated and passed through a die to produce an impregnated tow. The impregnation is macroscopic, i.e. the particles coat clusters of fibers rather than individual fibers leaving unwetted areas and voids. The process is targeted mainly at producing short fiber reinforced thermoplastics.

Fibers described above as suitable for use in making core 12 are also suitable in skins 18 and 20. The fibers in core 12 may be the same as or different from the fibers in skins 18 and 20. The fibers in skins 18 may also be the same as or different from the fibers in skin 20.

Similarly, the thermoplastic resins described above as suitable for use in core layer 12 may also be used in skins 18 and 20. The thermoplastic resin in core 12 may be the same as or different from the thermoplastic resin in skins 18 and 20. The thermoplastic resin in skins 18 may also be the same as or different from the thermoplastic resin in skins 20.

Skins 18 and 20 may be attached to core 12 during the manufacturing process of core 12 or skins 18 and 20 can be attached prior to forming an article, for example, an automotive interior component or an automobile exterior panel. Without limitation, skins 18 and 20 can be attached to core 12 by laminating the skin(s) to core 12, sonic welding of the skin(s) to core 12, or simply laid across core 12 before the article forming process. Other suitable techniques known in the art may be used, provided the advantages of the invention are achieved.

In one exemplary embodiment, an article is formed from thermoplastic composite 10 by heating the composite to a temperature sufficient to melt the thermoplastic resin. The heated thermoplastic composite 10 is then positioned in a mold, such as a matched aluminum mold, heated to about 160° F. and stamped into the desired shape using a low pressure press. Thermoplastic composite 10 can be molded into various articles using any method known in the art including, e.g., thermal forming, thermal stamping, vacuum forming, compression forming, and autoclaving.

In another embodiment, decorative layer 22 is applied to second reinforcing skin 20 by any known technique, for example, lamination, adhesive bonding, and the like. Decorative layer 22 may be formed, e.g., from a thermoplastic film of polyvinyl chloride, polyolefins, thermoplastic polyesters, thermoplastic elastomers, or the like. Decorative layer 22 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. Decorative layer 22 may also be made using spunbond, thermal bonded, spunlace, melt-blown, wet-laid, and/or dry-laid processes.

While the invention has been described in terms of various specific embodiments, those skilled in the art will recognize that the invention can be practiced with modification within the spirit and scope of the claims.

All patents, patent applications, and publications mentioned herein are hereby incorporated by reference in their entireties.

EXPERIMENTAL

Samples for the tests were prepared using porous composite core sheets made by the papermaking process described herein. The sheet materials contained finely dispersed filamentized chopped glass fibers with a nominal diameter of 16 microns and average chopped length of 12.7 mm. The glass loading was nominally from 34% to 70% by weight. Polybutylene terephthalate resin (GE Plastics, Valox 325®) was uniformly distributed through the thickness of the sheets. The sheets weighed nominally between 600 grams/m$^2$ and 1800 grams/m$^2$. The glass fiber content and the basis weights were varied as shown in Table 1.

TABLE 1

Experimental design sheet parameters

| | Valox Core Properties | | Xenoy 0/90 Bidirectional Tape Properties | | Design |
|---|---|---|---|---|---|
| Sample ID | Basis Weight (gsm) | Glass Content (%) | Basis Weight (gsm) | Glass Content (%) | Composite Thickness (mm) |
| L1 | 1065 | 34.4 | 580 | 46.6 | 2.5, 3.2 |
| L2 | 883 | 39.5 | 580 | 46.6 | 1.8, 3.2 |
| L3 | 1767 | 39.5 | 580 | 46.6 | 2.5, 3.2 |
| L4 | 1401 | 41.6 | 580 | 46.6 | 1.8, 3.2 |
| L7 | 883 | 39.5 | 730 | 48.4 | 1.8, 2.5 |
| L8 | 1767 | 39.5 | 730 | 48.4 | 1.8, 3.2 |
| L10 | 1145 | 51.4 | 580 | 46.6 | 1.8, 2.5, 3.2 |
| L12 | 1547 | 45.5 | 580 | 46.6 | 1.8, 3.2 |
| L13 | 1143 | 53.1 | 580 | 46.6 | 1.8, 2.5, 3.2 |
| L18 | 603 | 54.2 | 580 | 46.6 | 1.8, 3.2 |
| L19 | 1561 | 63.6 | 580 | 46.6 | 2.5, 3.2 |

The continuous fiber tapes were made with continuous yarns of glass fibers and Xenoy® resin (GE Plastics). Xenoy® resin is a 75%/25% w/w blend of polybutylene terephthalate and Bisphenol-A polycarbonate resins. The continuous fiber tapes were made using the melt impregnation process described in U.S. Pat. No. 6,709,995 (processing temperatures for Xenoy resin were set for the extruder zones in the range of 450-600° F. with a die temperature of 495° F.). Two sets of bi-directional tapes weighing nominally 580 grams/m$^2$ and 730 grams/m$^2$ and with a nominal fiber content of 47%+/−2% were used. The tapes were laminated on the surface of the porous composite sheets described above according to the parameters shown in the Table 1.

The continuous fiber tapes were laminated on the surface of the porous composite sheets in a daylight platen press. The continuous fiber tapes and the porous composite sheet were assembled between two thin steel plates to facilitate handling. The assembly was heated in the double daylight press for four minutes at 260° C. to allow the assembly to uniformly reach the set temperature. A pressure of 4 bar was applied to intimately bond the bi-directional tapes onto the porous composite sheets. The assembly was then transferred to a water cooled daylight platen press and cooled to room temperature before demolding the laminate from the steel plates.

The laminated composite panels were reheated in a forced air oven to 260° C. for four minutes and transferred to a water cooled daylight platen press and pressed to the predetermined thicknesses using metal shim stocks as stops placed on either side of the samples. The laminates were molded to the predetermined thicknesses according to the parameters shown in the Table 1.

The molded composites laminates were then conditioned in a temperature and humidity controlled environment maintained at 72° F. and 50% relative humidity for 24 hours. The conditioned samples were used in the tests summarized in Tables 2a, 2b, and 2c, and tested according to the ASTM or ISO test standard noted below.

Flexural and Impact Properties

Flexural tests were conducted on the composites described above according to the ISO 14125 test method. The samples for the flexural tests were nominally 25 mm wide with a support span of 64 mm. Samples were prepared for testing in the machine direction (MD)

Density measurements were conducted according to ASTM D3574. Instrumented impact testing was conducted according to ASTM D3763-2/ISO 6603.2.

Results for the flexural and impact measurements are shown in Tables 2a, 2b and 2c: Table 2a presents results showing the effect of tape basis weight and laminate thickness, Table 2b shows results of the effect of core glass content and laminate thicknesses, and Table 2c shows results of the effect of core basis weight and laminate thickness. The specimen ID in each table refers to the samples shown in Table 1. Design and measured composite sample sheet thicknesses are also provided in Tables 2a, 2b, and 2c.

TABLE 2a

Effect of Tape Basis Weight and Laminate Thickness on Flexural and Impact Properties

| ID | Composite Thickness Design (mm) | Composite Thickness Actual (mm) | Core Basis Weight (gsm) | Core Glass Content (wt. %) | Tape Basis Weight (gsm) | Tape Glass Content (wt. %) | Flexural Properties Strength (MPa) | Flexural Properties Modulus (MPa) | Impact Properties Peak Force (N) | Impact Properties Energy @ Break (J) |
|---|---|---|---|---|---|---|---|---|---|---|
| L02 | 1.8 | 1.6 | 883 | 39.5 | 580 | 46.6 | 163.8 | 15,813 | 1775 | 11.52 |
| L07 | 1.8 | 1.8 | 883 | 39.5 | 730 | 48.4 | 166.2 | 15,190 | 2184 | 14.68 |
| L03 | 3.2 | 3.1 | 1767 | 39.5 | 580 | 46.6 | 45.6 | 6663 | 2259 | 17.41 |
| L08 | 3.2 | 3.3 | 1767 | 39.5 | 730 | 48.4 | 59.6 | 7082 | 2110 | 19.52 |

From Table 2a, it may be generally noted that higher tape basis weight did not provide significant improvements in the flexural properties at lower thickness, but did show improved impact performance for the composite. For larger composite thicknesses, increased tape basis weight also provided improvements in the flexural properties, but did not appear to have a significant effect on the impact performance of the composite.

TABLE 2b

Effect of Core Glass Content and Laminate Thickness on Flexural and Impact Properties

| ID | Composite Thickness Design (mm) | Composite Thickness Actual (mm) | Core Basis Weight (gsm) | Core Glass Content (wt. %) | Tape Basis Weight (gsm) | Tape Glass Content (wt. %) | Flexural Properties Strength (MPa) | Flexural Properties Modulus (MPa) | Impact Properties Peak Force (N) | Impact Properties Energy @ Break (J) |
|---|---|---|---|---|---|---|---|---|---|---|
| L01 | 2.5 | 2.5 | 1065 | 34.4 | 580 | 46.6 | 69.3 | 7828 | 2042 | 16.15 |
| L10 | 2.5 | 2.5 | 1145 | 51.4 | 580 | 46.6 | 44.0 | 6343 | 1899 | 13.88 |
| L10 | 2.5 | 2.5 | 1145 | 51.4 | 580 | 46.6 | 48.4 | 6336 | 1,551 | 13.50 |
| L01 | 3.2 | 3.1 | 1065 | 34.4 | 580 | 46.6 | 46.1 | 5822 | 1807 | 13.55 |
| L13 | 3.2 | 3.3 | 1143 | 53.1 | 580 | 46.6 | 21.22 | 3289 | 1466 | 11.54 |
| L03 | 2.5 | 2.6 | 1767 | 39.5 | 580 | 46.6 | 65.9 | 8354 | 1747 | 14.42 |
| L19 | 2.5 | 2.5 | 1561 | 63.6 | 580 | 46.6 | 42.1 | 6460 | 1682 | 13.34 |
| L03 | 3.2 | 3.1 | 1767 | 39.5 | 580 | 46.6 | 45.6 | 6663 | 2259 | 17.41 |
| L12 | 3.2 | 3.3 | 1547 | 45.5 | 580 | 46.6 | 30.9 | 2915 | 1783 | 15.77 |
| L19 | 3.2 | 3.4 | 1561 | 63.6 | 580 | 46.6 | 20.7 | 2503 | 1835 | 16.33 |

From Table 2b, it may be seen that for all basis weight ranges and composite thicknesses, a reduction in the glass content of the core generally resulted in improved flexural and impact performance.

TABLE 2c

Effect of Core Basis Weight and Laminate Thickness on Flexural and Impact Properties

| | Composite Thickness | | Core | | Tape | | Flexural Properties | | Impact Properties | |
|---|---|---|---|---|---|---|---|---|---|---|
| ID | Design (mm) | Actual (mm) | Basis Weight (gsm) | Glass Content (wt. %) | Basis Weight (gsm) | Glass Content (wt. %) | Strength (MPa) | Modulus (MPa) | Peak Force (N) | Energy @ Break (J) |
| L02 | 3.2 | 3.0 | 883 | 39.5 | 580 | 46.6 | 24.4 | 5280 | 1883 | 16.20 |
| L01 | 3.2 | 3.1 | 1065 | 34.4 | 580 | 46.6 | 46.1 | 5822 | 1807 | 13.55 |
| L04 | 3.2 | 3.2 | 1401 | 41.6 | 580 | 46.6 | 42.1 | 5181 | 2264 | 19.12 |
| L18 | 1.8 | 1.9 | 603 | 54.2 | 580 | 46.6 | 57.36 | 10,066 | 1745 | 11.38 |
| L13 | 1.8 | 1.8 | 1143 | 53.1 | 580 | 46.6 | 109.86 | 12,513 | 1618 | 12.24 |
| L18 | 3.2 | 3.2 | 603 | 54.2 | 580 | 46.6 | 19.12 | 2959 | 1352 | 15.28 |
| L13 | 3.2 | 3.3 | 1143 | 53.1 | 580 | 46.6 | 21.22 | 3289 | 1466 | 11.54 |

As shown in Table 2c, increased core basis weight resulted in improved composite flexural properties at lower glass content and at lower composite thickness, but did not show a similar effect on the flexural properties at higher thickness.

Heat Distortion Temperature Properties

Heat distortion tests were conducted on the composites described above according to ISO 75 for flatwise samples at 1.82 MPa.

TABLE 3

Heat Distortion Temperature (ISO 75) Results for Valox Core/Xenoy 0/90 Tape Composites

| | Composite Thickness | | Core | | Tape | | Heat Distortion |
|---|---|---|---|---|---|---|---|
| ID | Design (mm) | Actual (mm) | Basis Weight (gsm) | Glass Content (wt. %) | Basis Weight (gsm) | Glass Content (wt. %) | Temperature (° C.) |
| L01 | 3.2 | 3.1 | 1065 | 34.4 | 580 | 46.6 | 179.4 |
| L02 | 3.2 | 3.0 | 883 | 39.5 | 580 | 46.6 | 138.1 |
| L03 | 3.2 | 3.1 | 1767 | 39.5 | 580 | 46.6 | 203.9 |
| L04 | 3.2 | 3.2 | 1401 | 41.6 | 580 | 46.6 | 195.1 |
| L07 | 2.5 | 2.5 | 883 | 39.5 | 730 | 48.4 | 206.7 |
| L08 | 3.2 | 3.3 | 1767 | 39.5 | 730 | 48.4 | 206.1 |
| L10 | 3.2 | 3.3 | 1145 | 51.4 | 580 | 46.6 | 170.1 |
| L12 | 3.2 | 3.3 | 1547 | 45.5 | 580 | 46.6 | 202.9 |
| L13 | 3.2 | 3.3 | 1143 | 53.1 | 580 | 46.6 | 167.4 |
| L18 | 3.2 | 3.2 | 603 | 54.2 | 580 | 46.6 | 106.4 |
| L19 | 3.2 | 3.4 | 1561 | 63.6 | 580 | 46.6 | 176.3 |

From Table 3, it may be noted that lower core glass content may be generally associated with higher heat distortion temperatures. Some effect on the heat distortion temperature may also be associated with the core and tape basis weight.

What is claimed is:

1. A non-porous fiber reinforced composite having an improved combination of flexural, impact, and heat distortion temperature characteristics, comprising:
a fiber reinforced thermoplastic core comprising a plurality of reinforcing fibers bonded together with one or more first thermoplastic resins, said core comprising a first surface and a second surface; and
a plurality of first skins applied to said first surface, wherein said first skins are bonded to each other,
wherein each said first skin comprises one or more bi-directional continuous fiber tapes comprising a plurality of continuous fibers arranged in a first principal direction and a plurality of continuous fibers arranged in a second principal direction and one or more second thermoplastic resins impregnated with the bi-directional continuous fiber tape, the plurality of continuous fibers in each said first principal direction and said second principal direction being independently arranged in a corresponding first and second unidirectional orientation; and
wherein, the composite demonstrates an improved combination of flexural, impact, and heat distortion temperature properties at reduced fiber content in the thermoplastic core; and
wherein, the flexural modulus of the composite is greater than about 2000 MPa and the flexural strength is greater than about 15 MPa; and
wherein, the impact energy is greater than about 11 J.

2. The fiber reinforced composite of claim 1, wherein the bi-directional continuous fiber tape comprises one or more first unidirectional tapes having a plurality of continuous fibers arranged in the first principal direction and one or more second unidirectional tapes having a plurality of continuous fibers arranged in the second principal direction, the first and second unidirectional tapes being independently impregnated with the one or more second thermoplastic resins that are the same or different.

3. The fiber reinforced composite of claim 2, wherein the orientation of the first principal direction ranges from about 0 to about 90 degrees relative to the orientation of the second principal direction.

4. The fiber reinforced composite of claim 1, wherein the bi-directional continuous fiber tape formed from a first plurality of continuous fibers arranged in the first principal direction and a second plurality of continuous fibers arranged in the second principal direction, and being impregnated with one or more second thermoplastic resins.

5. The fiber composite of claim 4, wherein the orientation of the first principal direction ranges from about 0 to 90 degrees relative to the orientation of the second principal direction.

6. The fiber reinforced composite of claim 1, wherein the bi-directional continuous fiber tape comprises a bulk tow mat having a plurality of layers of unidirectional fiber tows, with one or more layers having unidirectional fiber tows arranged in the first principal direction and one or more layers having unidirectional fiber tows arranged in the second principal direction.

7. The fiber reinforced composite of claim 6, wherein the orientation of the first principal direction ranges from about 0 to about 90 degrees relative to the orientation of the second principal direction.

8. The fiber reinforced composite of claim 7, wherein a first layer of unidirectional fiber tows has a first principal direction that differs from the second principal direction of at least one adjacent second layer of unidirectional fiber tows.

9. The fiber reinforced composite of claim 1, wherein an angle defined by a longitudinal axis of said plurality of fibers in one first skin and a longitudinal axis of said plurality of fibers in an adjacent first skin ranges between about 0 degrees to about 90 degrees.

10. The fiber reinforced composite of claim 1, wherein the composite further comprises at least one second skin comprising a plurality of fibers bonded together with a third thermoplastic resin.

11. The fiber reinforced composite of claim 10, wherein the first thermoplastic resin, the second thermoplastic resin, and the third thermoplastic resin are the same or different thermoplastic resin.

12. The fiber reinforced composite of claim 1, wherein the composite comprises a plurality of second skins bonded of the second surface of the core.

13. The fiber reinforced composite of claim 1, wherein the fiber content is between about 20 wt % and about 80 wt % of the composite.

14. The fiber reinforced composite of claim 1, wherein the fiber content is between about 40 wt. % and about 70 wt. % of the composite.

15. The fiber reinforced composite of claim 1, wherein the core comprises about 15 wt. % to about 85 wt. % reinforcing fibers.

16. The fiber reinforced composite claim 1, wherein at least one of the reinforcing fibers in the core and the fibers in each first skin are independently selected from metal fibers, metalized inorganic fibers, metalized synthetic fibers, glass fibers, polyester fibers, polyamide fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, or combinations thereof.

17. The fiber reinforced composite of claim 10, wherein at least one of the reinforcing fibers in the core, the fibers in each first skin, and the fibers in each second skin are independently selected from metal fibers, metalized inorganic fibers, metalized synthetic fibers, glass fibers, polyester fibers, polyamide fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, or combinations thereof.

18. The fiber reinforced composite of claim 1, wherein at least one of the first thermoplastic resin and the second thermoplastic resin is independently selected from polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyimides, polyphenylene ether, polyphenylene oxide, polyphenylenesulphide, polyethers, polyetherketones, polyacetals, polyurethanes, polybenzimidazole, and copolymers or mixtures thereof.

19. The fiber reinforced composite of claim 10, wherein at least one of the first thermoplastic resin, the second thermoplastic resin, and the third thermoplastic resin is independently selected from polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyimides, polyphenylene ether, polyphenylene oxide, polyphenylenesulphide, polyethers, polyetherketones, polyacetals, polyurethanes, polybenzimidazole, and copolymers or mixtures thereof.

20. The fiber reinforced composite of claim 1, wherein second thermoplastic resin is impregnated within the bi-directional continuous fiber tape of the first skin by solution processing, slurry processing, melt impregnation, fiber co-mingling, or dry powder impregnation.

21. The fiber reinforced composite of claim 1, wherein the thermoplastic core is prepared by a dry laid or a wet laid method.

22. The fiber reinforced composite of claim 21, wherein the thermoplastic core is prepared by a method comprising,
   adding reinforcing fibers and a thermoplastic resin to an agitated liquid-containing foam to form a dispersed mixture of thermoplastic resin and reinforcing fibers,
   depositing the dispersed mixture of reinforcing fibers and thermoplastic resin onto a forming support element;
   evacuating the liquid to form a web;
   heating the web above the softening temperature of the thermoplastic resin; and
   compressing the web to a predetermined thickness to form the thermoplastic core.

23. The fiber reinforced composite of claim 10, wherein the third thermoplastic resin is impregnated into the fibers of the second skin by solution processing, slurry processing, melt impregnation, fiber co-mingling, or dry powder impregnation.

24. An article formed from the fiber reinforced composite of claim 1.

* * * * *